United States Patent
Sugiyama et al.

(10) Patent No.: US 8,804,282 B1
(45) Date of Patent: Aug. 12, 2014

(54) MAGNETIC WRITE HEAD HAVING A HYBRID MATERIAL MAIN POLE FOR HIGH FREQUENCY RECORDING

(71) Applicant: HGST Netherlands B.V., Amsterdam (NL)

(72) Inventors: Mikito Sugiyama, Odawara (JP); Hiromi Shiina, Hitachi (JP); Kazue Kudo, Odawara (JP); Yusuke Takahashi, Odawara (JP); Kimitoshi Eto, Odawara (JP)

(73) Assignee: HGST Netherlands N.V., Amsterdam (NL)

( * ) Notice: Subject to any disclaimer, the term of this patent is extended or adjusted under 35 U.S.C. 154(b) by 0 days.

(21) Appl. No.: 13/865,071

(22) Filed: Apr. 17, 2013

(51) Int. Cl.
*G11B 5/127* (2006.01)

(52) U.S. Cl.
USPC ...................................... 360/125.12

(58) Field of Classification Search
USPC ...................................... 360/125.12
See application file for complete search history.

(56) References Cited

U.S. PATENT DOCUMENTS

| | | | |
|---|---|---|---|
| 6,507,464 B1 | 1/2003 | Ohashi et al. | |
| 6,809,901 B2 | 10/2004 | Minor | |
| 7,554,765 B2 | 6/2009 | Shukh et al. | |
| 8,064,161 B2 | 11/2011 | Kudo et al. | |
| 8,149,538 B2 | 4/2012 | Fuchizaki et al. | |
| 8,238,058 B2 | 8/2012 | Shimizu et al. | |
| 8,254,060 B1* | 8/2012 | Shi et al. | 360/125.1 |
| 8,400,732 B2* | 3/2013 | Matono | 360/125.12 |
| 8,625,234 B2* | 1/2014 | Guan et al. | 360/125.13 |
| 2012/0075752 A1 | 3/2012 | Sato et al. | |
| 2012/0113769 A1 | 5/2012 | Hirata et al. | |

OTHER PUBLICATIONS

IBM, "Magnetic Recording Head, Write Structure with Chamfered Top-Pole, Top Corners to Reduce Adjacent Track Interference and Method of Making the Same", http://ip.com/IPCOM/000014740, Added to Prior Art Database on Jun. 20, 2003, 1 page, Disclosure No. IPCOM000014740D dated Dec. 1, 2000.

* cited by examiner

*Primary Examiner* — Mark Blouin
(74) *Attorney, Agent, or Firm* — John D. Henkhaus

(57) ABSTRACT

Approaches for a magnetic write head having a hybrid material main pole, in which a first magnetic material has a first cross-sectional area (A1) and a second magnetic material has a second cross-sectional area (A2), and wherein the ratio A1/A2 reduces in a direction away from the air bearing surface. The first material comprises a high saturation magnetic flux density material, and the second material comprises a high magnetic permeability and low saturation magnetic flux density material having a lower saturation magnetic flux density than said first material.

20 Claims, 13 Drawing Sheets

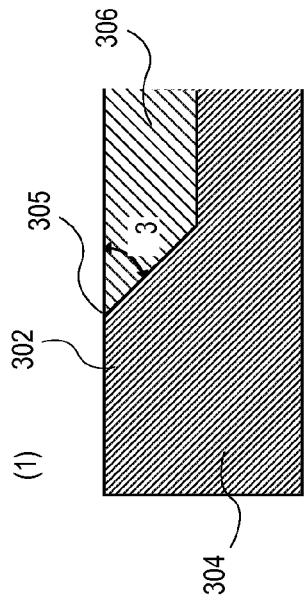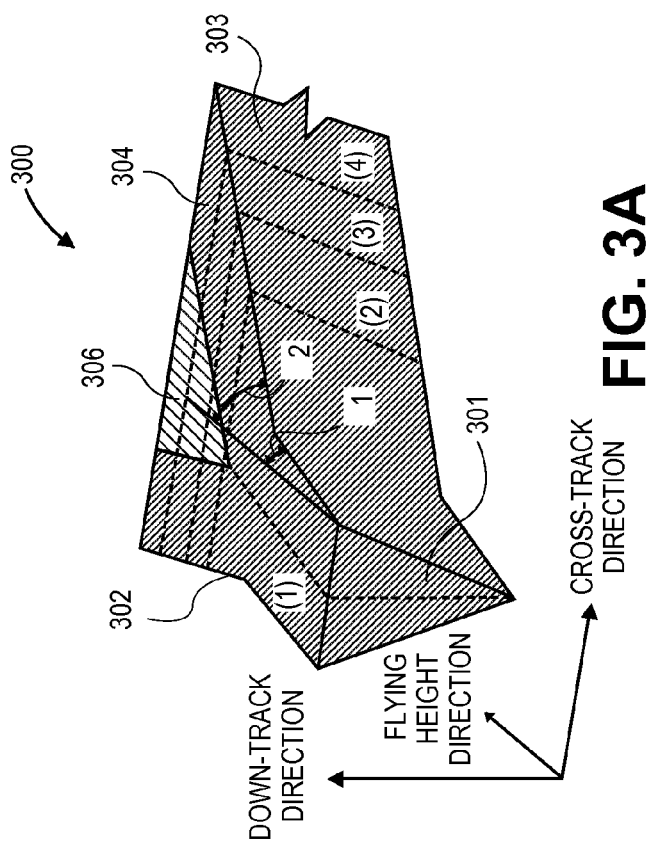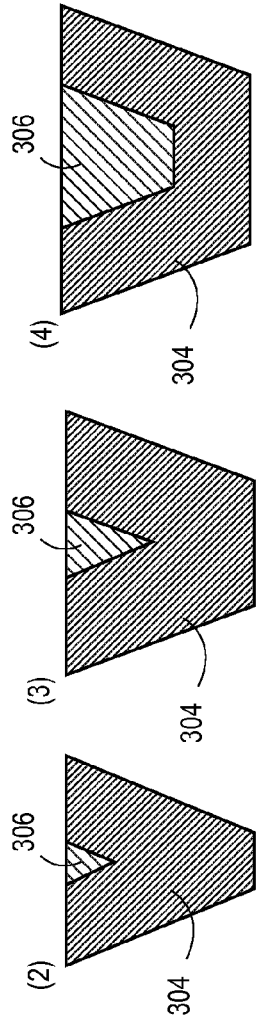
FIG. 3B
FIG. 3A
FIG. 3C

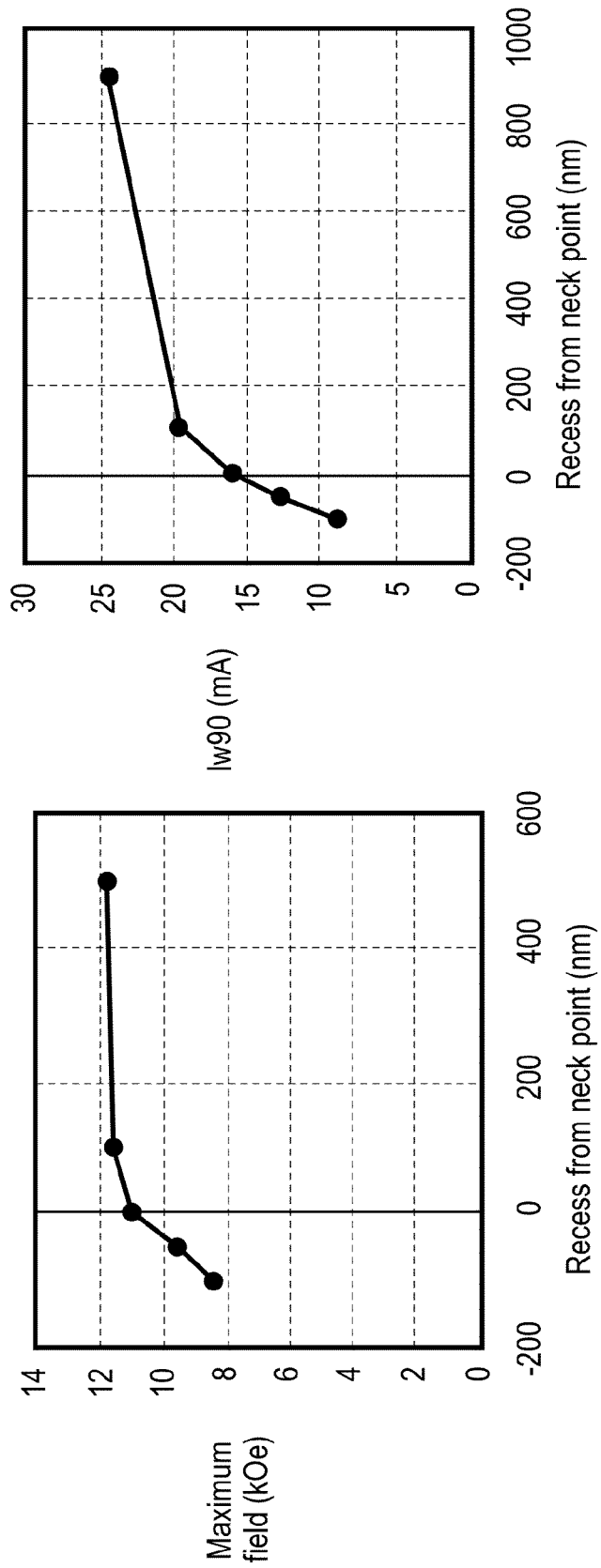

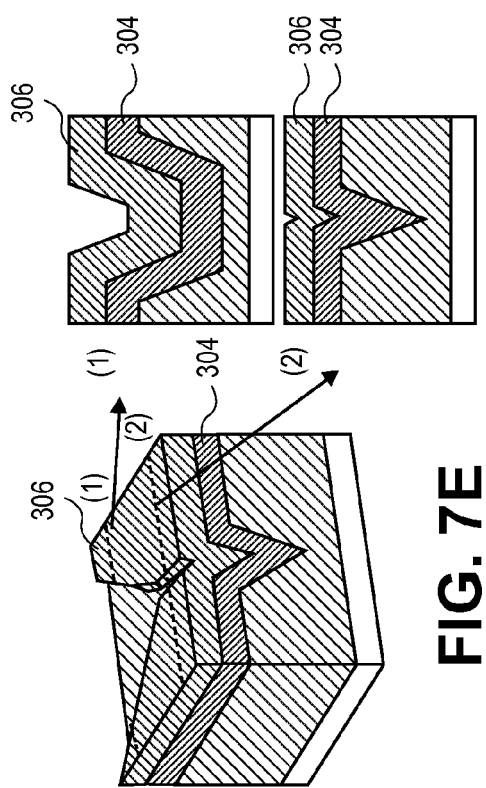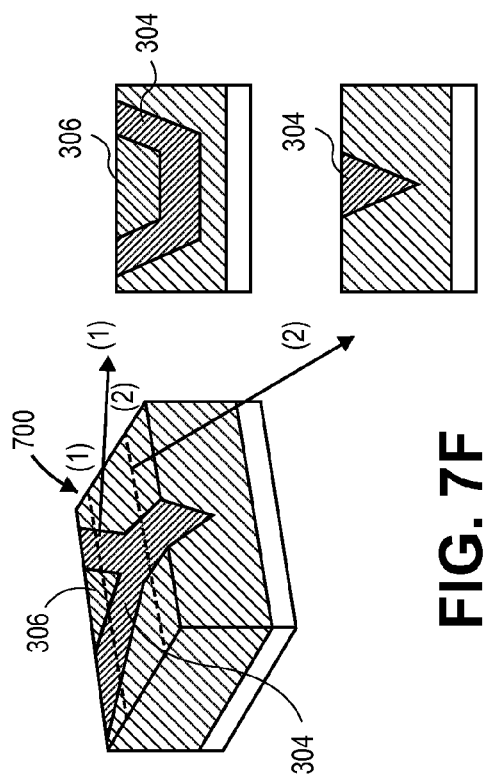
FIG. 7E
FIG. 7F

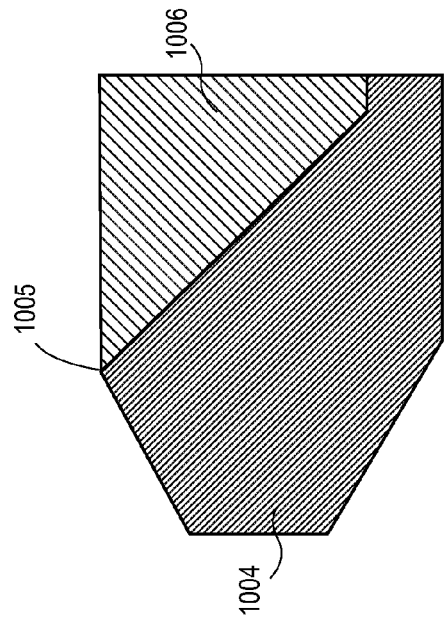
FIG. 10B
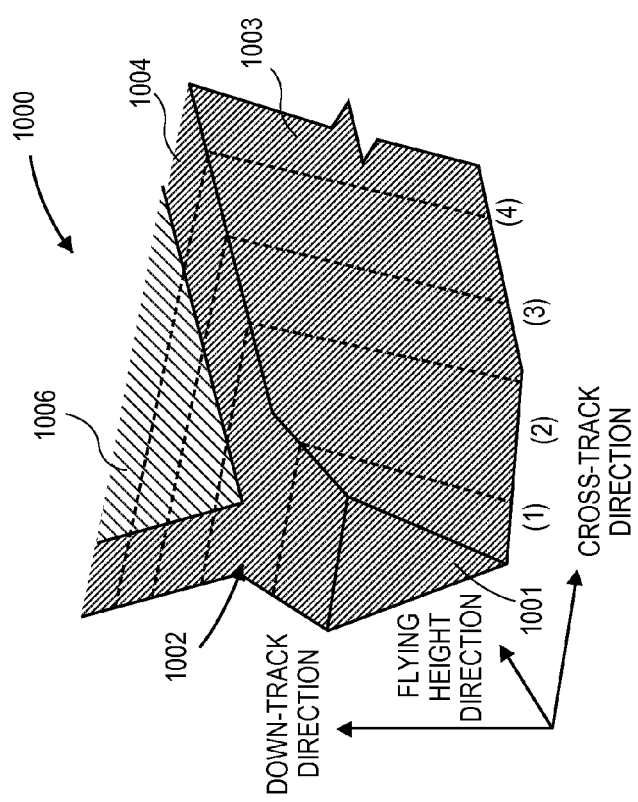
FIG. 10A
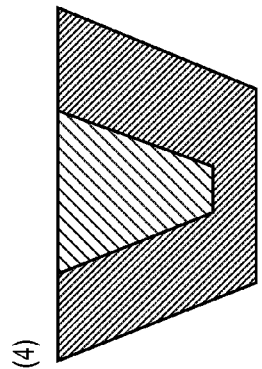
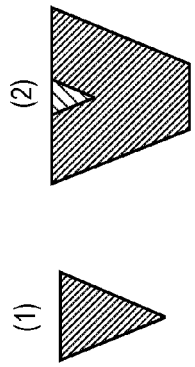
FIG. 10C

US 8,804,282 B1

MAGNETIC WRITE HEAD HAVING A HYBRID MATERIAL MAIN POLE FOR HIGH FREQUENCY RECORDING

FIELD OF THE INVENTION

Embodiments of the invention relate generally to perpendicular magnetic recording and more particularly to a magnetic writer having a hybrid material main pole for high frequency recording.

BACKGROUND

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates. A slider therefore is said to "fly" over the surface of the magnetic-recording disk.

Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

A perpendicular magnetic recording (PMR) system records data as magnetizations oriented perpendicular to the plane of the magnetic-recording disk. The magnetic disk has a magnetically soft underlayer covered by a thin magnetically hard top layer. The perpendicular write head has a main pole with a very small cross section at the pole tip, tapered down from the cross section along the length of the yoke from which the pole tip protrudes, and a return pole having a much larger cross section along the length. A write head may also include a wrap-around shield, for assisting in focusing the magnetic field emitting from pole tip, and a back gap. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Advanced PMR writers demand high data rate write heads, especially for advanced server products, commensurately with increases in calculation processing frequency and increases in data communication rates. The high-speed data transfer performance of HDDs is generally governed by the response rate of the mechanical systems and recording/reproduction elements in the recording/reproduction mechanism.

SUMMARY OF EMBODIMENTS OF THE INVENTION

Embodiments of the invention are directed to curbing the phenomenon whereby recording errors increase together with increases in recording frequency in hard disk drive (HDD) recording heads, and to achieving high data transmission speeds.

According to an embodiment, a perpendicular magnetic recording write head comprises a write pole having a hybrid material main pole, in which a first material has a first cross-sectional area (A1) and a second material has a second cross-sectional area (A2) and wherein the ratio A1/A2 reduces in a direction away from the air bearing surface. Further, the first material comprises a high saturation magnetic flux density material and the second material comprises a high magnetic permeability and low saturation magnetic flux density material having a lower saturation magnetic flux density than said first material.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 3A is a perspective view of the pole tip end of a partial magnetic writer main pole, according to an embodiment of the invention;

FIG. 3B is a cross-sectional side view of the partial magnetic writer main pole of FIG. 3A, according to an embodiment of the invention;

FIG. 3C are cross-sectional side views of the partial magnetic writer main pole of FIG. 3A, according to an embodiment of the invention;

FIGS. 6A and 6B are graphs illustrating the relationship between the main pole second material recess position and maximum field intensity and $I_w 90$, respectively, according to an embodiment of the invention;

FIGS. 7A-7F are diagrams illustrating an example process for manufacturing a hybrid material main pole, according to an embodiment of the invention;

FIG. 10A is a perspective view of a main pole having a tapered structure on the main pole leading side and/or trailing side, according to an embodiment of the invention;

FIG. 10B is a cross-sectional side view of the main pole of FIG. 10A, according to an embodiment of the invention; and FIG. 10C are cross-sectional side views of the main pole of FIG. 10A, according to an embodiment of the invention.

DETAILED DESCRIPTION

Approaches to the configuration and the manufacturing process for a magnetic write head having a hybrid material main pole, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
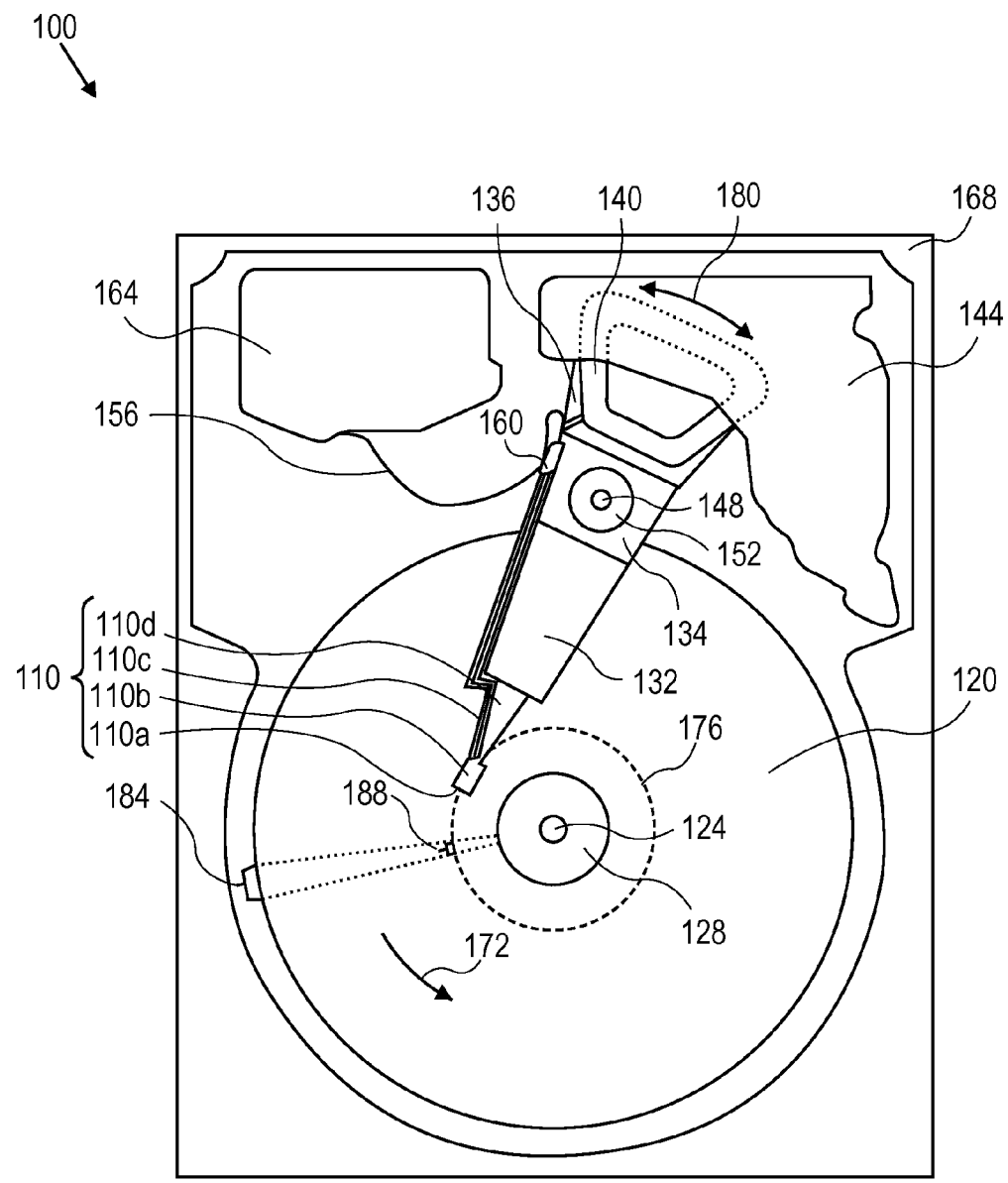
FIG. 1 is a plan view of an HDD, according to an embodiment of the invention.

Embodiments of the invention may be used in the context of the manufacturing and use of a magnetic writer for a hard-disk drive (HDD). In accordance with an embodiment of the invention, a plan view of a HDD 100 is shown in FIG. 1. FIG. 1 illustrates the functional arrangement of components of the HDD including a slider 110*b* that includes a magnetic-reading/recording head 110*a*. Collectively, slider 110*b* and head 110*a* may be referred to as a head slider. The HDD 100 includes at least one head gimbal assembly (HGA) 110 including the head slider, a lead suspension 110*c* attached to the head slider, and a load beam 110*d* attached to the lead suspension 110*c*. The HDD 100 also includes at least one magnetic-recording disk 120 rotatably mounted on a spindle 124 and a drive motor (not shown) attached to the spindle 124 for rotating the disk 120. The head 110*a* includes a write element and a read element for respectively writing and reading information stored on the disk 120 of the HDD 100. The disk 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110*a*, are provided by a flexible interconnect cable 156 ("flex cable"). Interconnection between the flex cable 156 and the head 110*a* may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110*b* rides so that the slider 110*b* flies above the surface of the disk 120 without making contact with a thin magnetic-recording medium of the disk 120 in which information is recorded.

The electrical signal provided to the voice coil 140 of the VCM enables the head 110*a* of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of stacked tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110*a* of the HGA 110 reads the servo-burst-signal pattern which provides a position-error-signal (PES) to the servo electronics, which controls the electrical signal provided to the voice coil 140 of the VCM, enabling the head 110*a* to follow the track 176. Upon finding the track 176 and identifying a particular sectored track portion 188, the head 110*a* either reads data from the track 176 or writes data to the track 176 depending on instructions received by the disk controller from an external agent, for example, a microprocessor of a computer system.

Figure 2:
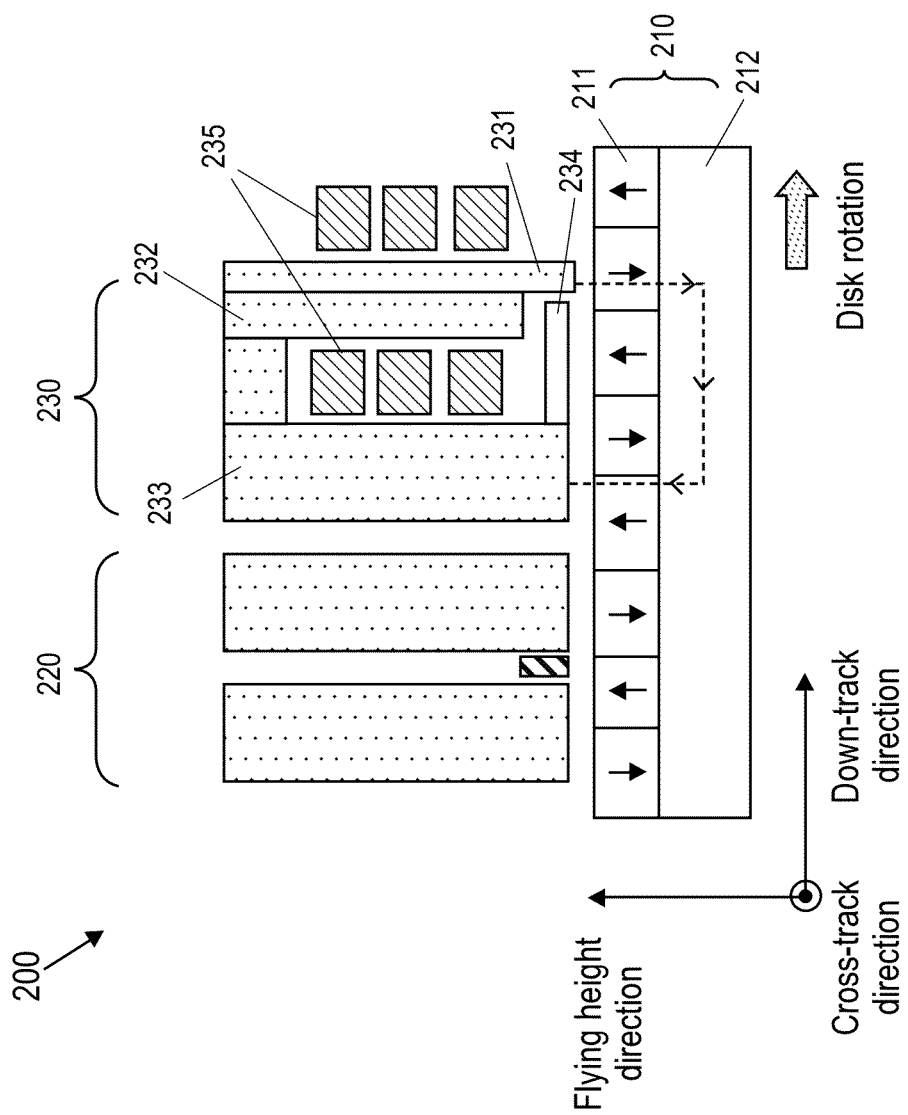
FIG. 2 is a cross-sectional side view of a perpendicular magnetic recording head, according to an embodiment of the invention.

FIG. 2 is a cross-sectional side of a perpendicular magnetic recording (PMR) head, according to an embodiment of the invention. FIG. 2 illustrates a PMR head 200 in recording relation with a perpendicular magnetic recording medium such as disk 210. PMR head 200 comprises a reader 220 and a writer 230.

PMR writer 230 comprises a main pole 231, an auxiliary pole 232 (also at times referred to as a "stitch pole"), a writer coil 235, a magnetic shield 234, and a return pole 233. Main pole 231 is exposed at the ABS (air bearing surface) and faces disk 210 and forms recording bits by reversing the magnetization of magnetic particles in the disk 210. Auxiliary pole 232 is magnetically connected to the main pole 23 but is not typically exposed at the ABS. Writer coil 235 is for exciting the main pole 231 and the auxiliary pole 232, i.e., the electricity flowing through the coil 235 produces a magnetic field.

The magnetic shield 234 (also at times referred to as a "wrap-around shield" or "WAS") is positioned at the periphery of the main pole 231 tip for assisting with focusing the magnetic flux emitting from main pole 231, and a return pole 233 is positioned for providing means for the magnetic flux to return to the writer structure to complete the magnetic circuit.

As mentioned, electrical pulses are sent to the coil 235 of writer 230 with different patterns of positive and negative currents and the current in the coil 235 induces a magnetic field across the gap between the main pole 231 and the disk 210, which in turn magnetizes a small area on the recording medium. A strong, highly concentrated magnetic field emits from the main pole 231 in a direction perpendicular to the 210 disk surface, magnetizing the magnetically hard top layer 211. The resulting magnetic flux then travels through the soft underlayer 212, returning to the return pole 233 where it is sufficiently spread out and weak that it will not erase the signal recorded by the main pole 231 when it passes back through the magnetically hard top layer 211 on its way back to the return pole 233.

Introduction

As mentioned, the high-speed data transfer performance of HDDs is generally governed by the response rate of the mechanical systems and recording/reproduction elements in the recording/reproduction mechanism. In recording systems in the latter case, the response of the recording head decreases as the recording frequency increases, and write errors increase. In order to curb this, the speed with which the tip end of the recording head is magnetized with respect to excitation from the recording coil is important.

The responsiveness of the head magnetic field to recording current generally varies according to any reduction in the magnetic circuit length, the shape of the auxiliary pole, structural elements such as the excitation coil, and the magnetic characteristics of the constituent materials. Research continues to improve the soft magnetic characteristics by means of the composition and film-forming method of material systems comprising Fe, Co and Ni as the main constituent elements, which are used in conventional poles. However, in the case of Fe-, Co- and Ni-based materials, those with good soft magnetic characteristics tend to have a lower saturation flux density, causing a reduction in the head field, i.e., a reduction in the saturation recording properties. Thus, it is a challenging problem to find compatibility between recording current responsiveness and saturation recording properties. Consequently, there is value in inhibiting the phenomenon whereby recording errors increase together with increases in recording frequency in HDD recording heads, and in achieving high data transmission speeds.

Magnetic Write Head Having a Hybrid Material Main Pole

FIG. 3A is a perspective view of the pole tip end of a partial magnetic writer main pole 300, according to an embodiment of the invention. FIG. 3B is a cross-sectional side view of the partial magnetic writer main pole 300 of FIG. 3A, according to an embodiment of the invention. FIG. 3C are cross-sectional side views of the partial magnetic writer main pole 300 of FIG. 3A, according to an embodiment of the invention. Referring to FIG. 3A, the boundary of the region where the width in the ABS region changes gently, such as with pole tip 301, and the region where the width changes by a large amount further away from the ABS, such as with yoke 303, defines the main pole neck point 302.

According to an embodiment, the tip end of the main pole in the region of the surface facing the medium (referred to as the air bearing surface, or "ABS") increases in width in the cross-track direction further away from the ABS. As a result, the head field intensity can be increased. By producing a gentle change in width in the region of the ABS (as depicted in the successive cross-sectional views 2, 3, and 4 of FIG. 3C), increases in recording width are restricted and the track density can be increased. For example, the angle ($\theta_1$) at which pole tip 301 widens in a direction away from the ABS is approximately 25° for the portion closer to the ABS than said neck point 302, and the angle ($\theta_2$) at which yoke 303 widens in a direction away from the ABS is approximately 45° for the portion further from the ABS than said neck point 302.

Furthermore, the embodiments depicted in FIGS. 3A-3C show that the main pole 300 comprises two types of magnetic material. The pole tip 301 end of the main pole 300 first comprises a high saturation flux density material 304 (the outer portion, also referred to herein as the "first material") comprising Fe, Co, Ni. Additionally, the rear-end portion of the main pole, away from the ABS, comprises a region employing a material 306 (the inner portion, also referred to herein as the "second material") having lower saturation flux density and higher magnetic permeability than the tip-end portion of the main pole, i.e., material 304). Furthermore, the front tip end 305 (FIG. 3B) of the material 306 is characterized in that it is positioned further away from the ABS than the neck point 302 of the main pole 300, and the width thereof in the down-track direction increases further away from the ABS.

The angle ($\theta_3$) formed by the material 306 leading-side end and the direction perpendicular to the ABS is approximately 45°. As a result, the pole tip 301 region of main pole 300 comprises only the magnetic material 304, and the yoke 303 region of main pole 300 also comprises the magnetic material 306 in the region beyond the neck point 302 and increases further away from the ABS.

Development of a Magnetic Write Head Having a Hybrid Material Main Pole

Figure 4:
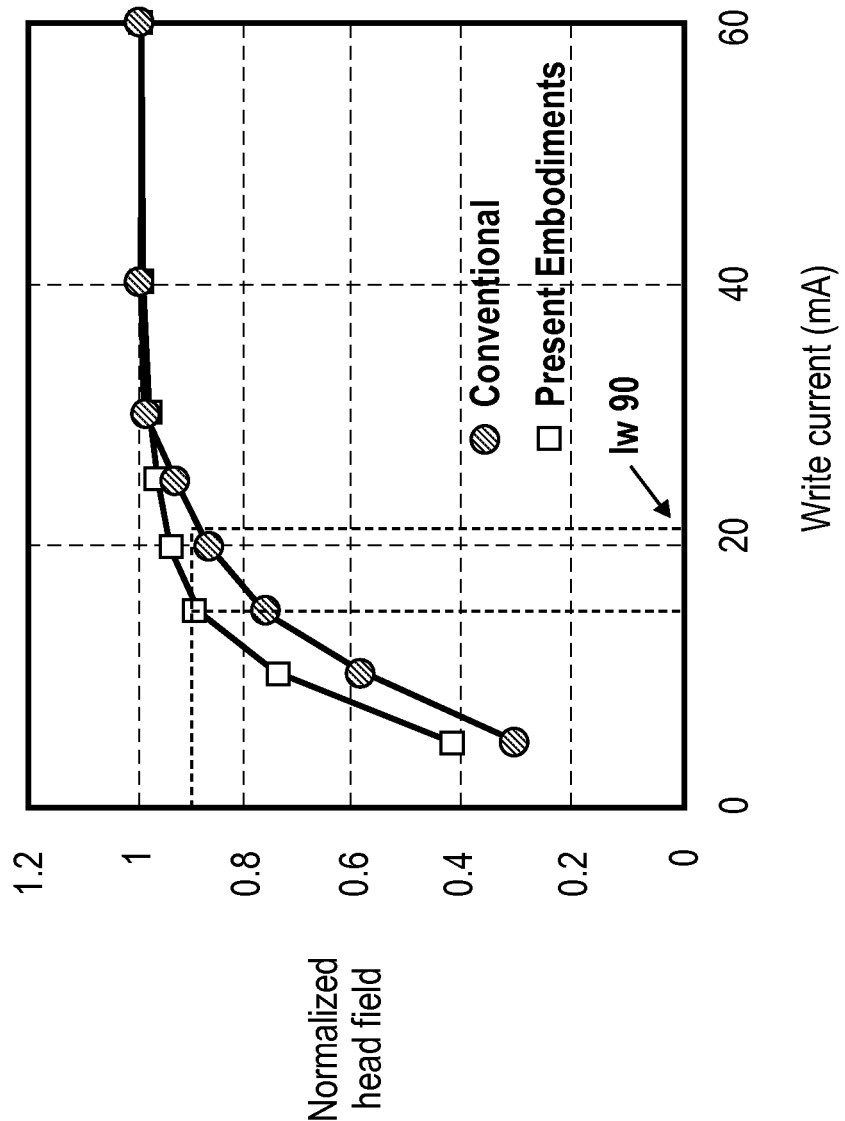
FIG. 4 is a graph illustrating the relationship between write current and head field intensity, according to an embodiment of the invention.

The responsiveness of the head field to the recording current was investigated by changing the distance of the main pole neck point 302 (e.g., FIG. 3A) and the front tip end 305 (FIG. 3B) of the main pole material 306. FIG. 4 is a graph illustrating the relationship between the write current and the head field intensity, according to an embodiment of the invention. FIG. 4 shows the dependency of the field intensity on the recording (write) current when the front tip end 305 of the main pole material 306 is at the main pole neck point 302. FIG. 4 shows that with the hybrid main pole structure of present embodiments, the recording field rises at a lower current. The current at which the field intensity reaches 90% of the saturation field intensity is defined as $I_w 90$, taking the field intensity at 60 mA as the saturation field intensity. The $I_w 90$ with a conventional structure is 21 mA, whereas with the hybrid main pole structure of present embodiments this value is 15 mA, thus the head field better tracks the excitation current. Furthermore, the saturation field intensity is shown to be slightly reduced with the hybrid main pole structure.

Figures 5A, 5B:
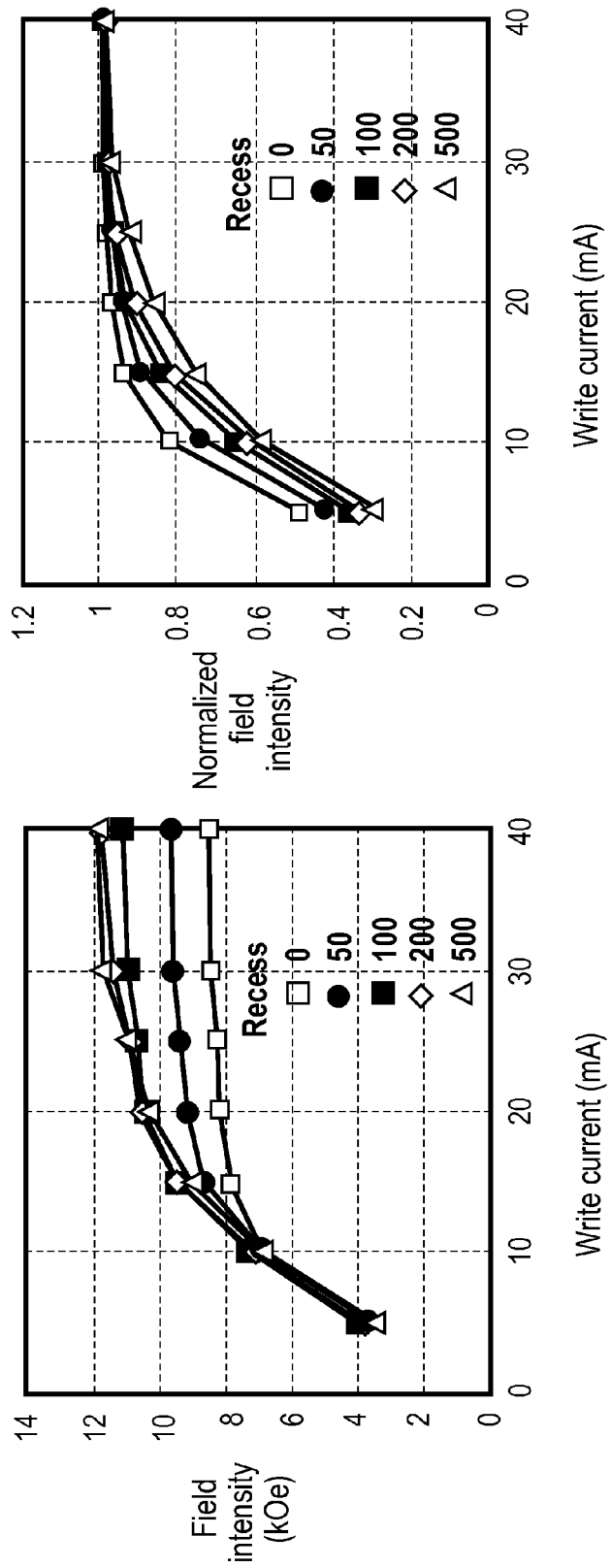
FIGS. 5A and 5B are graphs illustrating the effect of the main pole second material recess position on the relationship between write current and head field intensity, according to an embodiment of the invention.

Next, results of investigating how this current dependency changes according to the position of the main pole material 306 (hereinafter referred to as the "recess position"), are described. FIGS. 5A and 5B are graphs illustrating the effect of the main pole material 306 recess position on the relationship between write current and head field intensity, according to an embodiment of the invention. FIGS. 5A and 5B show the results of investigating the dependency of the field intensity on the write current when the distance between the ABS and the second material 306, i.e., the recess position, was varied between 0 and 500 nm.

Referring to FIG. 5B, the field intensity is normalized at a maximum field intensity of 60 mA. FIG. 5B shows that as the recess position becomes smaller, the field intensity starts to increase at a lower excitation current. Therefore, to improve the responsiveness of the recording field to the excitation current, the main pole second material 306 should preferably be provided at a position closer to the ABS. On the other hand, in reference to FIG. 5A, as the recess position becomes smaller the maximum field intensity decreases. Thus, it is necessary to set the recess position from the point of view of both recording current responsiveness and saturation recording performance.

FIGS. 6A and 6B are graphs illustrating the relationship between the main pole second material recess position and the maximum field intensity and $I_w90$, respectively, according to an embodiment of the invention. FIG. 6A shows the dependency of the maximum field intensity on the recess position, and FIG. 6B shows the dependency of $I_w90$ on the recess position.

Referring to FIG. 6B, $I_w90$ decreases as the recess amount decreases, and this decrease is particularly large closer to the main pole neck point 302 (FIGS. 3A and 3B). On the other hand, in reference to FIG. 6A, the maximum field intensity changes only slightly in a range where the recess position is further from the ABS than the main pole neck point 302, and decreases sharply in the closer range. This is because the overall volume of the main pole first material 304 and the main pole second material 306 is sufficiently larger in the region further away from the main pole neck point 302 than the volume at the pole tip 301 (FIG. 3A) end portion of the main pole 300, because the narrowing angle $\theta_2$ is larger in the region behind (further from the ABS) the main pole neck point 302 compared with the narrowing angle $\theta_1$ at the pole tip 301 end of the main pole 300. Thus, the rate of increase in the cross-sectional area in the flying height direction is larger, moving away from the ABS. Increasing the proportion of the magnetic material 306 that has low saturation flux density decreases the mean saturation flux density. However, coincidentally the overall cross-sectional area of the main pole 300 increases, so the amount of flux passing through the main pole 300 is still sufficient to saturate the pole tip 301 of the main pole 300 and the effect on the field intensity is reduced. In view of the foregoing, positioning the second material 306 closer to but behind the neck point 302 improves the recording current responsiveness without adversely affecting the head field intensity.

Materials for a Hybrid Material Main Pole

According to embodiments, the magnetic permeability of the material used for the material 306 is greater than that of the material used for the material 304. A high saturation flux density material is preferably used for the magnetic material 304 which forms the pole tip 301 end of the main pole 300 (FIG. 3A). According to an embodiment, material 304 comprises, as main constituent elements, Fe, Co and Ni. By setting the amounts of these elements in the ranges of 40 at. %<Fe<80 at. %, 20 at. %<Co<60 at. %, 0 at. %<Ni<5 at. %, it is possible to achieve a saturation flux density of 2.3 T or greater, which is suitable for the material 304 forming the tip end of the main pole. Meanwhile, $Ni_xFe_{1-x}$(x>20 at. %), which has excellent soft magnetic characteristics, may be used for the material 306 which has lower saturation flux density and higher magnetic permeability than the material 304.

Manufacturing a Hybrid Material Main Pole

Figure 7A:
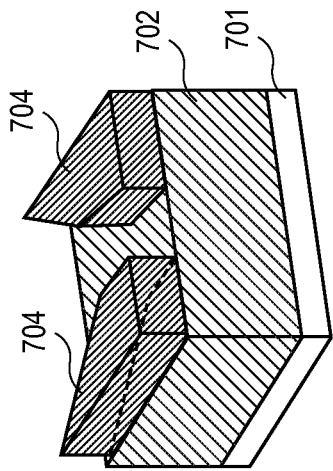
Figure 7B:
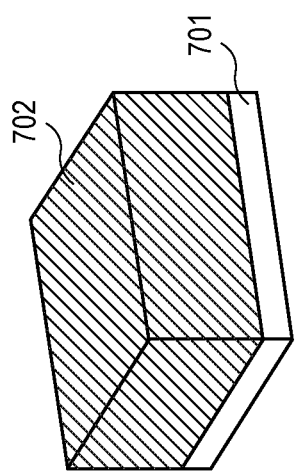
Figure 7C:
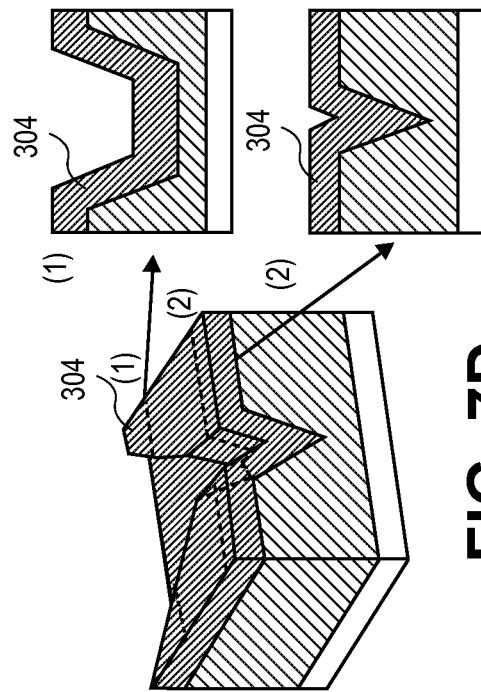
Figure 7D:
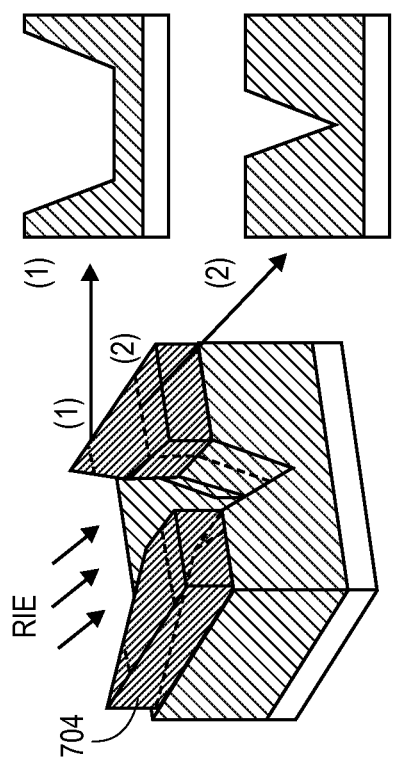

FIGS. 7A-7F are diagrams illustrating an example process for manufacturing a hybrid material main pole, according to an embodiment of the invention. FIG. 7A depicts a base 702 such as $Al_2O_3$, or $SiO_2$, formed on a substrate 701. As depicted in FIG. 7B, an etching mask 704 is formed by means of photolithography on the $Al_2O_3$ or $SiO_2$ base. The shape of the main pole is then formed by means of RIE (reactive ion etching) or the like, depicted in FIG. 7C, with cross-sectional shapes generally as depicted in FIG. 7C(1) and FIG. 7C(2). The side surfaces of the groove in this case are inclined with respect to the vertical direction and, as a result, the main pole can be formed as an inverted triangular shape. After removing the mask 704, the first magnetic material 304 (FIGS. 3A and 3B), which is a high-saturation flux density material, is formed by means of plating, depicted in FIG. 7D. In this process, by adjusting the film thickness of the material 304, most of the groove is buried by the material 304 because the tip end of the main pole 300 (FIG. 3A) is narrow in the cross-track direction (FIG. 7D(1)), and only part of the groove is buried at the rear portion of the main pole (FIG. 7D(2)). Next, the magnetic material 306 (FIGS. 3A and 3B) is formed by means of plating, as depicted in FIGS. 7E, 7E(1), and 7E(2). The surface is then planarized, for example by means of CMP (chemical-mechanical polishing, or chemical-mechanical planarization) or the like, as depicted in FIG. 7F, 7F(1), 7F(2).

Based on the fabrication process illustrated in FIGS. 7A-7F, the proportion of magnetic material 306 (FIGS. 3A and 3B) at the rear portion of the main pole 300 (FIG. 3A) can be increased further away from the ABS. The main pole fabricated by means of the foregoing process is characterized in that the film thickness of the magnetic material 304 at a position sufficiently far from the ABS is substantially constant. By adjusting the film thickness of the magnetic material 304, it is possible to adjust the effect of improving the field intensity and the current responsiveness of the field intensity.

Alternative Hybrid Main Pole Structures

Furthermore, the main pole 300 magnetic material 304 and main pole 300 magnetic material 306 may be positioned in layers parallel to the cross-track direction. This type of structure may be formed by the following process, for example.

Figure 8A:
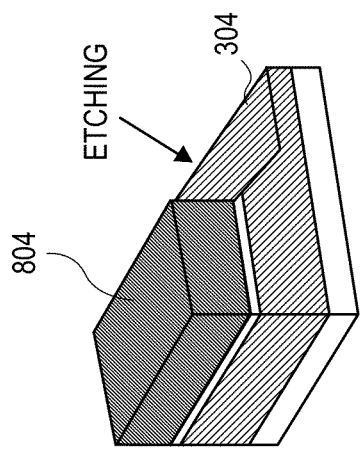
FIGS. 8A-8G are diagrams illustrating an example process for manufacturing a hybrid material main pole, according to an embodiment of the invention.
Figure 8B:
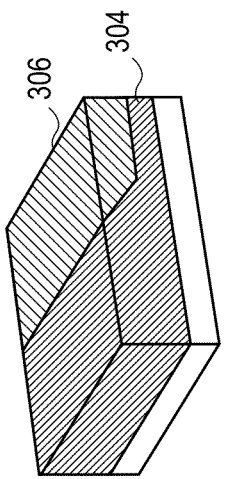
Figure 8C:
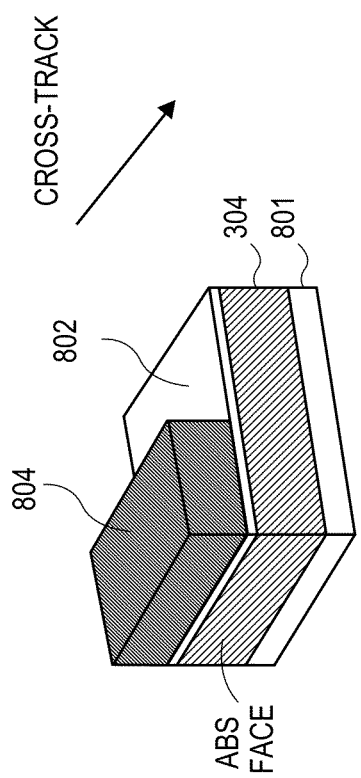
Figure 8D:
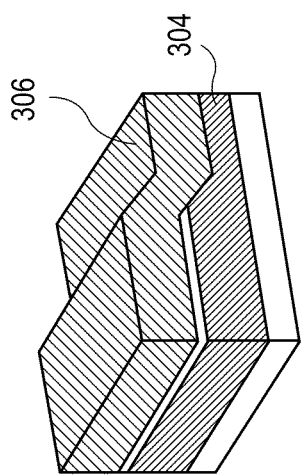
Figure 8F:
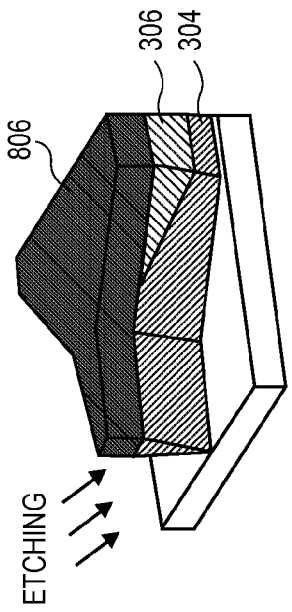
Figure 8E:
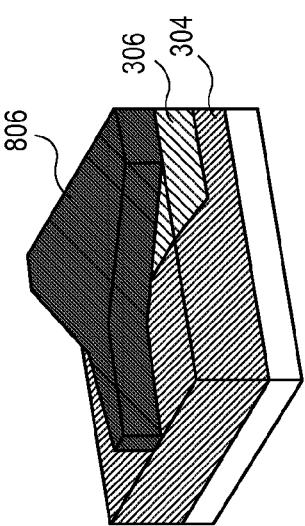
Figure 8G:
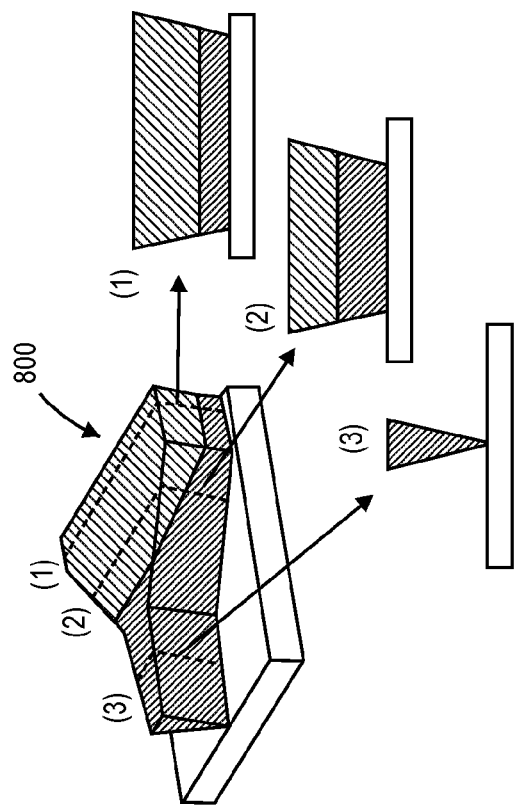

FIGS. 8A-8G are diagrams illustrating an example process for manufacturing a hybrid material main pole, according to an embodiment of the invention. The magnetic material 304, which is a high saturation flux density material, and a stopper layer 802 (e.g. DLC [diamond-like carbon] or Ta or the like) for the subsequent CMP process are first fabricated, after which an etching mask 804 parallel to the cross-track direction is formed at the required recess position, as depicted in FIG. 8A. With reference to FIG. 8B, the magnetic material 304 is etched, by means of ion milling or the like, to form an inclined part. The angle of inclination of the etched material 304 and the remaining film thickness thereof, can vary from implementation to implementation, by adjusting the etching angle/time in this process. In addition, the material 306 is fabricated, as depicted in FIG. 8C, and is planarized by means of CMP or the like, as depicted in FIG. 8D, whereby it is possible to form a layered film in which the thickness of the material 306 increases further away from the ABS. In addition, the CMP stopper 802 is removed by means of RIE or the like, after which a mask 806 in the shape of the main pole (e.g., main pole 300 of FIG. 3A) is formed thereon, as depicted in FIG. 8E. When the mask 806 is formed, the boundary between the material 304 and the material 306 is positioned further from the main pole neck point 302 (FIGS. 3A and 3B) than the ABS. The layered film is then processed to the required main pole shape by etching involving ion milling or the like, as depicted in FIG. 8F. The mask 806 is removed, resulting in a structure as depicted in FIGS. 8G, 8G(1), 8G(2), and 8G(3), wherein the mating interface at which at least a portion of material 304 and at least a portion of material 306 meet is substantially planar and inclined downward from the top of the main pole and backward in a direction away from said air bearing surface.

Figure 9A:
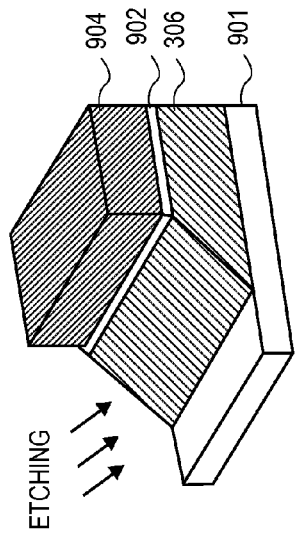
FIGS. 9A-9G are diagrams illustrating an example process for manufacturing a hybrid material main pole, according to an embodiment of the invention.
Figure 9B:
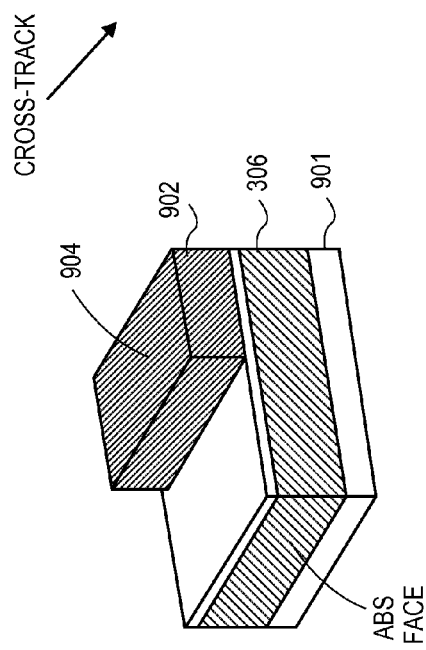
Figure 9C:
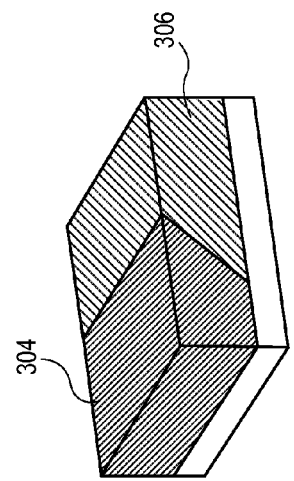
Figure 9D:
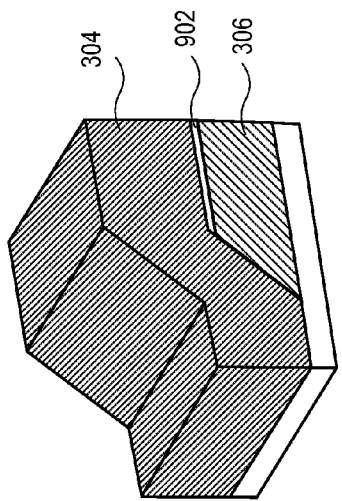
Figure 9E:
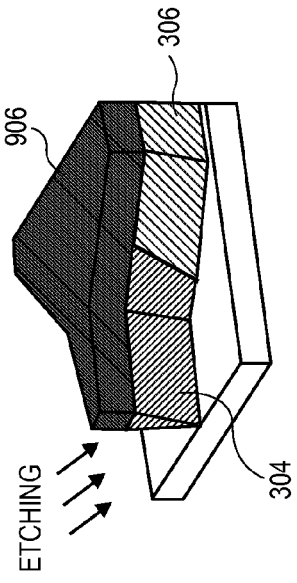
Figure 9F:
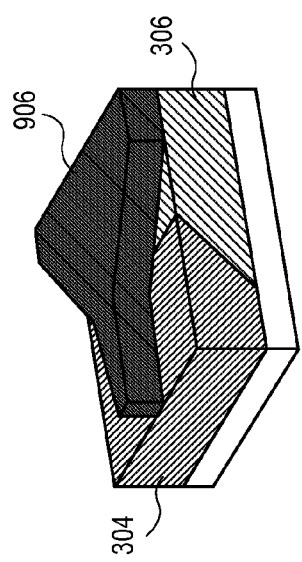
Figure 9G:
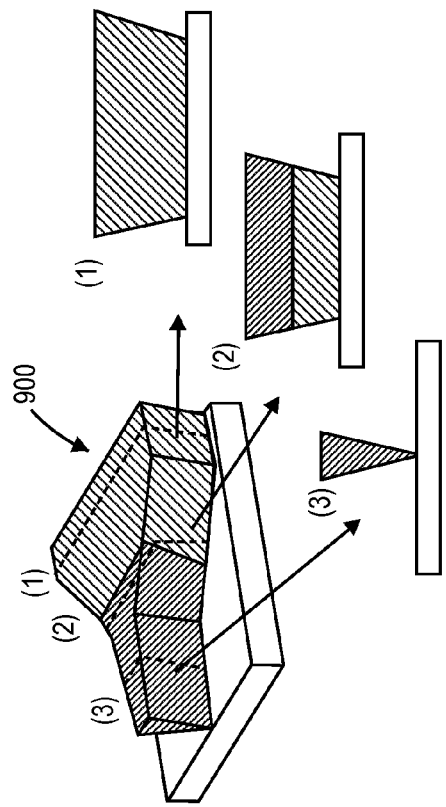

Still further, the same effect can still be achieved if the magnetic material 306 (FIGS. 3A and 3B) is formed in such a way as to lie on the leading side of the main pole. FIGS. 9A-9G are diagrams illustrating an example process for manufacturing a hybrid material main pole, according to an embodiment of the invention. FIG. 9A illustrates that the material 306 and the CMP stopper 902 are fabricated, after which an etching mask 904 parallel to the cross-track direction is formed on the side further away from the ABS than the required recess position. Then, the material 306 on the ABS side is removed by means of etching or the like, as depicted in FIG. 9B. After the mask 904 is removed, the magnetic material 304 (FIGS. 3A and 3B) is formed on the structure, as depicted in FIG. 9C, after which planarization is carried out by means of CMP or the like, as depicted in FIG. 9D. After the stopper 902 film is removed, a mask 906 in the shape of the main pole (e.g., main pole 300 of FIG. 3A) is formed, as depicted in FIG. 9E, and the layered film is processed to the shape of the main pole by means of etching involving ion milling or the like, as depicted in FIG. 9F. The mask 906 is removed, resulting in a structure as depicted in FIGS. 9G, 9G(1), 9G(2), and 9G(3), wherein the mating interface at which at least a portion of material 304 and at least a portion of material 306 meet is substantially planar and inclined upward from the bottom of the main pole and backward in a direction away from said air bearing surface.

Comparing the main pole 300 structure shown in FIGS. 3A-3C with the structure 900 shown in FIG. 9G(1)-(3), main pole 300 is preferred for improving the responsiveness to the recording current without adversely affecting the field intensity. This is because compared with the main pole 800 structure shown in FIG. 8G(1)-(3) and the main pole 900 structure shown in FIG. 9G(1)-(3), main pole 300 makes it possible to increase the proportion occupied by the main pole material 304 in the region of the tip end of the main pole material 306. The position where the material 306 is provided can therefore be brought closer to the ABS while the field intensity is maintained, and responsiveness to the recording current can be effectively improved. In terms of production methods, the main pole 300 is suitable for the process in which a groove in the shape of the main pole is formed and a magnetic film is formed therein by means of plating or sputtering, etc. (e.g., as in FIGS. 7A-7F), while the main pole 800 and the main pole 900 is suitable for a process in which a magnetic film is formed on a flat base and the main pole shape is formed by etching, employing a photomask or the like (e.g., as in FIGS. 8A-8G, and FIGS. 9a-9G).

Alternative Tapered Main Pole

According to an embodiment, a main pole has a tapered structure on the main pole leading side and/or trailing side, as depicted in FIGS. 10A-10C. According to an embodiment, FIG. 10A is a perspective view of a main pole having a tapered structure on the main pole leading side or trailing side, FIG. 10B is a cross-sectional side view of the main pole of FIG. 10A, and FIG. 10C are a cross-sectional side views of the main pole of FIG. 10A.

Referring to FIG. 10A, the boundary of the region where the width in the ABS region changes gently, such as with pole tip 901, and the region where the width changes by a large amount further away from the ABS, such as with yoke 903, defines the main pole neck point 302.

The embodiments depicted in FIGS. 10A-10C show that the main pole 1000 comprises two types of magnetic material. The pole tip 901 end of the main pole 900 first comprises a high saturation flux density material 904 (the outer portion, also referred to herein as the "first material") comprising Fe, Co, Ni. Additionally, the rear-end portion of the main pole, away from the ABS, comprises a region employing a material 906 (the inner portion, also referred to herein as the "second material") having lower saturation flux density and higher magnetic permeability than the tip-end portion of the main pole, i.e., material 304. Furthermore, the front tip end 1005 (FIG. 10B) of the material 1006 is characterized in that it is positioned further away from the ABS than the neck point 1002 of the main pole 1000, and the width thereof in the down-track direction increases further away from the ABS.

The angle formed by the material 306 leading-side end and the direction perpendicular to the ABS is approximately 45°. As a result, the pole tip 1001 region of main pole 1000 comprises only the magnetic material 1004, and the yoke 1003 region of main pole 1000 also comprises the magnetic material 1006 in the region beyond the neck point 1002 and increases further away from the ABS.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A perpendicular magnetic recording write head comprising:
   a write pole extending to an air bearing surface, said write pole comprising a main pole comprising a yoke from which a pole tip protrudes at a neck point, and said main pole comprising a first material having a first cross-sectional area (A1) and a second material having a second cross-sectional area (A2);
   a magnetic return pole, magnetically connected with said write pole in a region removed from said air bearing surface;
   a write coil arranged around said write pole so as to induce a magnetic flux in said write pole when electrical current flows through said write coil;
   and wherein the ratio A1/A2 reduces in a direction away from said air bearing surface.

2. The magnetic write head of claim 1,
wherein said first material comprises a high saturation magnetic flux density material; and
wherein said second material comprises a high magnetic permeability and low saturation magnetic flux density material having a lower saturation magnetic flux density than said first material.

3. The magnetic write head of claim 1,
wherein said first material comprises Fe, Co, and Ni with compositions 40%<Fe<80%, 20%<Co<60%, and 0%<Ni<5%; and
wherein said second material comprises Fe and Ni with composition Fe<80% and Ni<20%.

4. The magnetic write head of claim 1, wherein said second material begins at a position behind said neck point in a direction away from said air bearing surface.

5. The magnetic write head of claim 1,
wherein said main pole widens in a direction away from said air bearing surface; and
wherein the rate of change in a portion of said main pole which is closer to the air bearing surface than said neck point is smaller than the rate of change in a portion of said main pole which is further away from said neck point.

6. The magnetic write head of claim 1, wherein said second material widens in a direction away from said air bearing surface.

7. The magnetic write head of claim 1, wherein said second material is contained within said first material.

8. The magnetic write head of claim 1, wherein said second material, in a direction along said main pole away from said air bearing surface, transitions from a substantially triangular cross-sectional shape to a substantially trapezoidal cross-sectional shape.

9. The magnetic write head of claim 1, wherein at least a portion of said first material and at least a portion of said second material meet at a substantially planar interface, and wherein said interface is inclined downward and backward in a direction away from said air bearing surface.

10. The magnetic write head of claim 1, wherein at least a portion of said first material and at least a portion of said second material meet at a substantially planar interface, and wherein said interface is inclined upward and backward in a direction away from said air bearing surface.

11. A hard disk drive, comprising:
a head slider comprising a magnetic write head;
a magnetic-recording disk rotatably mounted on a spindle;
a voice coil motor configured to move the head slider to access portions of the magnetic-recording disk; and
wherein said magnetic write head comprises:
a write pole extending to an air bearing surface, said write pole comprising a main pole comprising a yoke from which a pole tip protrudes at a neck point, and said main pole comprising a first material having a first cross-sectional area (A1) and a second material having a second cross-sectional area (A2);
a magnetic return pole, magnetically connected with said write pole in a region removed from said air bearing surface;
a write coil arranged around said write pole so as to induce a magnetic flux in said write pole when electrical current flows through said write coil;
and wherein the ratio A1/A2 reduces in a direction away from said air bearing surface.

12. The hard disk drive of claim 11,
wherein said first material comprises a high saturation magnetic flux density material; and
wherein said second material comprises a high magnetic permeability and low saturation magnetic flux density material having a lower saturation magnetic flux density than said first material.

13. The hard disk drive of claim 11,
wherein said first material comprises Fe, Co, and Ni with compositions 40%<Fe<80%, 20%<Co<60%, and 0%<Ni<5%; and
wherein said second material comprises Fe and Ni with composition Fe<80% and Ni<20%.

14. The hard disk drive of claim 11, wherein said second material begins at a position behind said neck point in a direction away from said air bearing surface.

15. The hard disk drive of claim 11,
wherein said main pole widens in a direction away from said air bearing surface; and
wherein the rate of change in a portion of said main pole which is closer to the air bearing surface than said neck point is smaller than the rate of change in a portion of said main pole which is further away from said neck point.

16. The hard disk drive of claim 11, wherein said second material widens in a direction away from said air bearing surface.

17. The hard disk drive of claim 11, wherein said second material is contained within said first material.

18. The hard disk drive of claim 11, wherein said second material, in a direction along said main pole away from said air bearing surface, transitions from a substantially triangular cross-sectional shape to a substantially trapezoidal cross-sectional shape.

19. The hard disk drive of claim 11, wherein at least a portion of said first material and at least a portion of said second material meet at a substantially planar interface, and wherein said interface is inclined downward and backward in a direction away from said air bearing surface.

20. The hard disk drive of claim 11, wherein at least a portion of said first material and at least a portion of said second material meet at a substantially planar interface, and wherein said interface is inclined upward and backward in a direction away from said air bearing surface.

* * * * *